(12) United States Patent
Asakura et al.

(10) Patent No.: US 8,975,862 B2
(45) Date of Patent: Mar. 10, 2015

(54) POWER SUPPLY APPARATUS

(75) Inventors: Fumio Asakura, Okazaki (JP); Kenji Ochi, Nishio (JP); Hiroshi Yoshida, Chiryu (JP)

(73) Assignee: Denso Corporation, Kariya (JP)

( * ) Notice: Subject to any disclaimer, the term of this patent is extended or adjusted under 35 U.S.C. 154(b) by 761 days.

(21) Appl. No.: 13/248,269

(22) Filed: Sep. 29, 2011

(65) Prior Publication Data

US 2012/0081071 A1  Apr. 5, 2012

(30) Foreign Application Priority Data

Oct. 1, 2010 (JP) ................................. 2010-224169

(51) Int. Cl.
*H02J 7/00* (2006.01)
*H02J 7/02* (2006.01)

(52) U.S. Cl.
CPC ............... *H02J 7/0068* (2013.01); *H02J 7/022* (2013.01); *Y02T 10/92* (2013.01)
USPC ............................. 320/109; 320/138; 320/140

(58) Field of Classification Search
CPC .......................... B60L 11/1816; B60L 11/1824
USPC .................................................. 320/109, 138
See application file for complete search history.

(56) References Cited

U.S. PATENT DOCUMENTS 5,161,097 A * 11/1992 Ikeda ............................. 363/124
5,760,494 A * 6/1998 Takeda ............................. 307/39

FOREIGN PATENT DOCUMENTS

| JP | 06178461 | * | 6/1994 |
| JP | H6-178461 | | 6/1994 |
| JP | 2008-42999 | | 2/2008 |

OTHER PUBLICATIONS

English machine translation of JP06178461 performed on Jul. 9, 2014, 2 pages.*
Japanese Office Action dated Jul. 24, 2012, issued in corresponding Japanese Application No. 2010-224169 with English translation.

* cited by examiner

*Primary Examiner* — Richard Isla Rodas
*Assistant Examiner* — Nathaniel Pelton
(74) *Attorney, Agent, or Firm* — Nixon & Vanderhye P.C.

(57) ABSTRACT

In a power supply apparatus, a power source generates electric power at a predetermined source voltage. The first converter circuit converts the source voltage into a first voltage or a second voltage. The secondary battery is charged with electric power at the first voltage when the first converter circuit outputs electric power at the first voltage. The second converter circuit converts the first voltage of the electric power outputted from the first converter circuit or the secondary battery into the second voltage. The electric load device is supplied with electric power at the second voltage outputted from the second converter circuit. The direct power supply circuit directly supplies electric power at the second voltage outputted from the first converter circuit to the electric load device without passing through the second converter circuit when the first converter circuit outputs the electric power at the second voltage.

7 Claims, 3 Drawing Sheets

POWER SUPPLY APPARATUS

CROSS REFERENCE TO RELATED APPLICATION

This application is based on Japanese Patent Application No. 2010-224169 filed on Oct. 1, 2010, the disclosure of which is incorporated herein by reference.

FIELD OF THE INVENTION

The present invention relates to a power supply apparatus that supplies electric power generated from a power source to an electric load device through a converter circuit. More particularly, the present invention relates to a power supply apparatus that can efficiently supply electric power generated from a power source to a secondary battery and an electric load device having a large capacity.

BACKGROUND OF THE INVENTION

For example, Japanese Patent Application Publication 2008-42999 describes a power supply apparatus that uses a solar battery or a fuel battery as a power source device. In the power supply apparatus, the voltage of electric power generated in the power source device is converted through a first DC/DC converter circuit, and the electric power is then supplied to a DC power source line (e.g., DC bus line). Thus, a secondary battery connected to the DC power source line is electrically charged. Further, a second DC/DC converter circuit is connected between a DC power supply line to which an electric load device is connected and the DC power source line. Therefore, the electric power generated from the power source device is supplied to the electric load device via the first DC/DC converter circuit and the second DC/DC converter circuit.

SUMMARY OF THE INVENTION

In a case where a power supply apparatus includes an electric load device, such as a secondary battery, which can be disconnected from the power supply apparatus, it is necessary to electrically charge the electric load device in a short time so as to improve usability of the power supply apparatus. However, if an electric current for charging such an electric load device is supplied via two converter circuits, power efficiency will be degraded.

Further, in a case where the power supply apparatus includes an electric load device having a large capacity as one of electric load devices, its charging current increases, and thus the degradation of the efficiency is notable.

The present invention is made in view of the foregoing matter, and it is an object to provide a power supply apparatus with enhanced efficiency.

According to an aspect, a power supply apparatus includes a power source, a first converter circuit, a secondary battery, a second converter circuit, an electric load device and a direct power supply circuit. The power source generates electric power at a predetermined source voltage. The first converter circuit converts the predetermined source voltage into one of a first voltage and a second voltage. The secondary battery is charged at the first voltage when the first converter circuit outputs electric power at the first voltage. The second converter circuit converts one of the first voltage of electric power outputted from the first converter circuit and the first voltage of electric power outputted from the secondary battery into the second voltage. The electric load device is supplied with electric power at the second voltage outputted from the second converter circuit. The direct power supply circuit directly supplies the electric power outputted from the first converter circuit to the electric load device without passing through the second converter circuit, when the first converter circuit outputs the electric power at the second voltage.

In such a structure, when the first converter circuit outputs the electric power at the second voltage, the electric power is supplied to the electric load device via the direct power supply circuit. That is, the electric power is supplied to the electric load device without passing through the second converter circuit. Because the electric power is supplied to the electric load device while reducing loss, the efficiency of the power supply apparatus improves.

BRIEF DESCRIPTION OF DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereinafter, exemplary embodiments will be described with reference to the drawings.

First Embodiment

Figure 1:
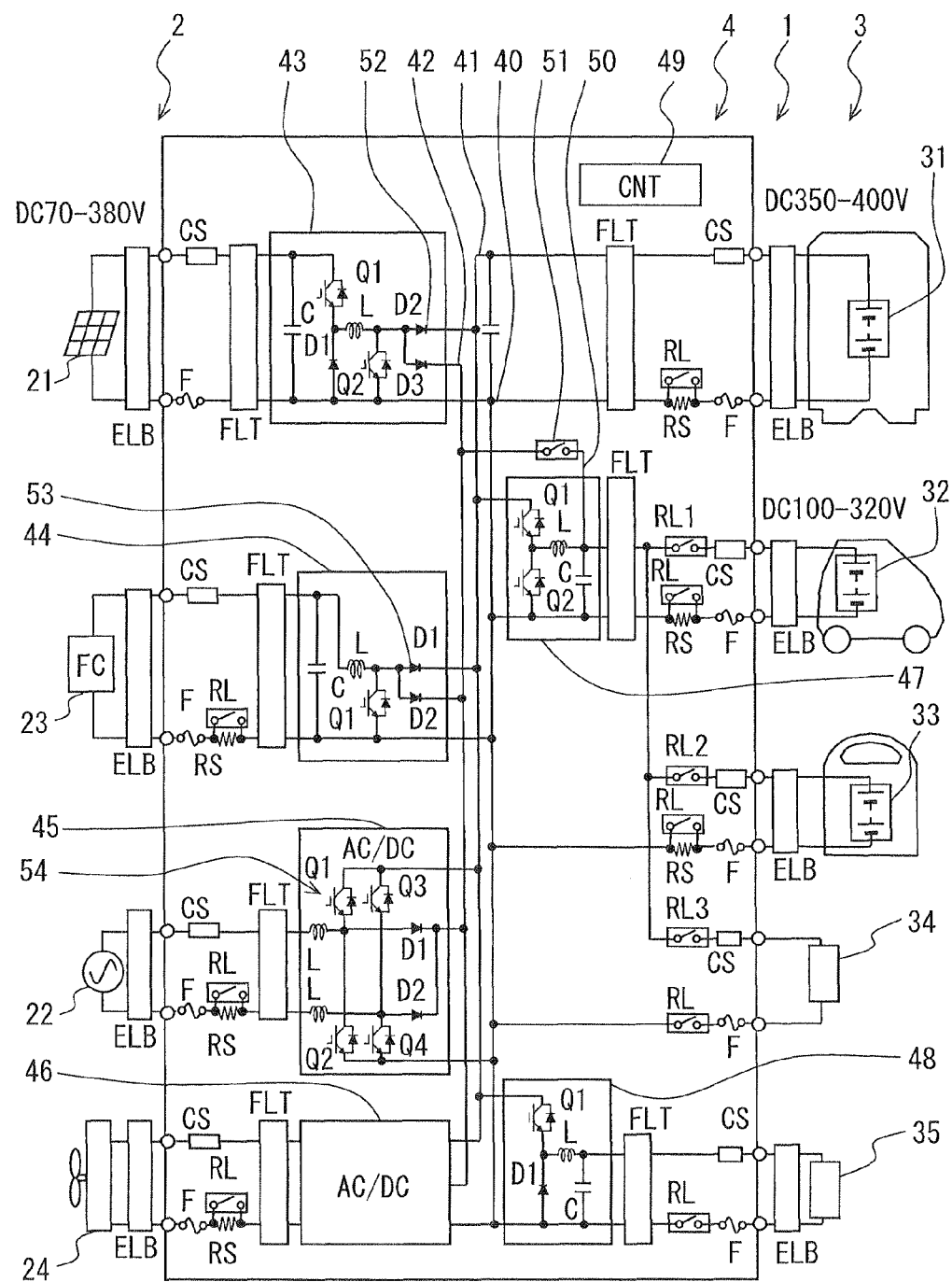
FIG. 1 is a block diagram of a power supply apparatus according to a first embodiment.

Referring to FIG. 1, a power supply apparatus 1 according to the present embodiment includes at least one power source device 2, at least one electric load device 3, and a power distribution device 4. Electric power generated from the power source device 2 is transformed, aggregated, distributed in the power distribution device 4, and then supplied to the electric load device 3. For example, the power supply apparatus 1 is included in a house or in an apartment house.

In an example shown in FIG. 1, the power supply apparatus 1 includes multiple power source devices 2 and multiple electric load devices 3. Each of the power source devices 2 provides a power source that generates electric power at a predetermined source voltage.

For example, the power source devices 2 include a solar power generator 21 and a fuel battery 23, as power source devices generating DC power. The solar power generator 21 includes a semiconductor solar panel, which is for example disposed on the roof of a house. The fuel battery 23 includes multiple fuel battery cells, which use hydrogen, methanol or the like as fuel.

The voltage of electric power generated by the solar power generator 21 varies depending on the amount of solar radiation. For example, the voltage of the electric power generated by the solar power generator 21 varies in a range between DC 70V and DC 380V.

The voltage of electric power generated by the fuel battery 23 is different in each model. For example, the voltage of electric power generated by the fuel battery 23 is in a range between 20V and 120V.

The power source device 2 further includes a commercial power source 22 and a wind power generator 24, as power source devices that supply AC power. The commercial power source 22 is provided by AC power supplied to each house from an electric grid. The commercial power source 22 is provided by AC power supplied from a provider such as an electric power supply company. The commercial power source 22 is also referred to as a system power source. The wind power generator 24 has a windmill and an alternator that is driven by rotation of the windmill.

The output of the commercial power source 22 is different in regions. For example, the voltage of electric power from the commercial power source 22 is AC 100V or AC 200V. The voltage of electric power generated by the wind power generator 24 varies depending on the velocity of wind. The voltage of the electric power generated by the wind power generator 24 varies in a range between 0V and 380V, for example.

The commercial power source 22 and the fuel battery 23 can relatively stably supply the electric power at a predetermined voltage. The solar power generator 21 and the wind power generator 24 are also referred to as natural energy power generators. The solar power generator 21 and the wind power generator 24 can supply the electric power at the voltages, which are relatively higher than those of the commercial power source 22 and the fuel battery 23. However, the voltages of the electric power from the commercial power source 22 and the fuel battery 23 are more stable than those of the solar power generator 21 and the wind power generator 24.

The electric load devices 3 include, for example, a fixed secondary battery 31, a secondary battery 32 for a vehicle, a portable secondary battery 33, a DC load 34 and a water heater 35. The fixed secondary battery 31 and the vehicle secondary battery 32 need to be charged. Thus, the fixed secondary battery 31 and the vehicle secondary battery 32 can be regarded as the electric load devices 3.

The fixed secondary battery 31 is provided as a main secondary battery of the power supply apparatus 1. The fixed secondary battery 31 is fixed to a house. The fixed secondary battery 31 is fixedly-connected to the power distribution device 4. The fixed secondary battery 31 is also referred to as a first secondary battery. The voltage of the secondary battery 31 is in a range between DC 350V and DC 400V. The voltage of the secondary battery 31 is high so as to narrow a DC bus line in the power distribution device 4. The voltage of the secondary battery 31 is approximately equal to or higher than a maximum voltage of the power source devices 21, 22, 23, 24.

The vehicle secondary battery 32 is mounted in a vehicle and used as a power source for driving the vehicle. The vehicle secondary battery 32 is mounted in a vehicle that belongs to a house that includes the power supply apparatus 1. The vehicle secondary battery 23 constitutes a part of the power supply apparatus 1 on condition that the vehicle is parked at a predetermined position and a connector terminal of the vehicle is connected to a connector terminal of the house through a cable. Thus, the vehicle secondary battery 32 can be connected to and disconnected from the power supply apparatus 1. The vehicle secondary battery 23 is connected to the power distribution device 4 to be charged by the power distribution device 4, or to supply electric power to another electric load device 3 or the commercial power source 22 via the power distribution device 4. The vehicle secondary battery 32 is also referred to as a second secondary battery.

The vehicle secondary battery 32 has a relatively large capacity so as to be used as the driving power source of the vehicle. The capacity of the vehicle secondary battery 32 is larger than that of the fixed secondary battery 31. The vehicle secondary battery 32 is connected to the power distribution device 4 only when the vehicle is parked near the house. The vehicle secondary battery 32 may be connected to the power distribution device 4 in a relatively short period of time. Therefore, the vehicle secondary battery 32 needs to be charged rapidly. The voltage of the vehicle secondary battery 32 is in a range between DC 100V and DC 320V. The voltage of the vehicle secondary battery 32 is lower than that of the fixed secondary battery 31.

The portable secondary battery 33 is furnished in the house as a power source device for an emergency such as a power cut. The portable secondary battery 33 has a capacity definitely smaller than those of the fixed secondary battery 31 and the vehicle secondary battery 32. The voltage of the portable secondary battery 33 is lower than that of the fixed secondary battery 31. Also, the voltage of the portable secondary battery 33 is lower than the vehicle secondary battery 32. The voltage of the portable secondary battery 33 is, for example, DC 48V.

The DC load 34 is a load device such as a heater. The rated voltage of the DC load 34 is, for example, DC 48V. The rated voltage of the DC load 34 is lower than the voltage of the vehicle secondary battery 32. The rated voltage of the DC load 34 can be approximately equal to or higher than the voltage of the portable secondary battery 33.

The water heater 35 generates hot water by operating a heater and/or a heat pump device through electric power supplied from the power distribution device 4. The rated voltage of the water heater 35 is in a range between the DC 40V and DC 320V.

The power distribution device 4 constitutes a power conversion system for supplying the electric power generated from the power source devices 2 to the electric load devices 3. The power distribution device 4 constitutes a multi-input multi-output distribution network that is connected to the multiple power source devices 2 and the multiple electric load devices 3.

The power distribution device 4 includes a grounding conductor 40 and DC bus lines, such as a first DC bus line 41 and a second DC bus line 42. The first DC bus line 41 is direct-connected to the first secondary battery 31, which is the main secondary battery of the power supply apparatus 1, as a major line. The voltage of the first DC bus line 41 is equal to the voltage of the first secondary battery 31. The second DC bus line 42 is provided as a dedicated line for supplying the electric power to the vehicle secondary battery 32, which is not always connected to the power supply apparatus 4. The voltage of the second DC bus line 42 is lower than that of the first DC bus line 41.

In the drawings, symbol ELB denotes an earth leakage breaker. The earth leakage breaker ELB is disposed between the corresponding power source device 2 and the power distribution device 4. The earth leakage breaker ELB is also disposed between the power distribution device 4 and the corresponding electric load device 3. Symbol FLT denotes a filter circuit for filtering high-frequency noise superimposed on a power source line. Symbol F denotes a fuse. Symbol RS denotes a resistive element for an excess current limiter or a current test. Symbol RL denotes a system relay that is closed after the connection of the power source device 2 or the electric load device 3.

Symbols RL1, RL2, and RL3 denote selective relays used as selective means for connecting any one of or any of the electric load devices 32, 33, 34, which are selectively connected or selectively in an operation state(s), to a converter circuit 47. Symbol CS is a current sensor that detects an electric current supplied from the corresponding power source 2 or supplied to the corresponding electric load device 3.

The power distribution device 4 includes multiple converter circuits 43, 44, 45, 46 each converting the voltage of the electric power supplied from the corresponding power source device 2 and supplying the electric power at the converted voltage into the first DC bus line 41 and the second DC bus line 42.

The converter circuit 43 is a full-bridge step-up and step-down converter circuit. The converter circuit 43 includes a reactor L, switching elements Q1, Q2 constructed of such as an insulated gate bipolar transistor (IGBT), diodes D1, D2, D3 and a smoothing capacitor C. The converter circuit 43 increases or decreases the voltage of the electric power supplied from the solar power generator 21 and supplies the electric power to the first DC bus line 41 and the second DC bus line 42.

The diodes D2, D3 are output diodes. The diodes D2, D3 divide the output of the converter circuit 43. An anode of the diode D2 is connected to a position between the reactor L and the switching element Q2, and a cathode of the diode D2 is connected to the first DC bus line 41. An anode of the diode D3 is connected to a position between the reactor L and the switching element Q2, and a cathode of the diode D2 is connected to the second DC bus line 42. The diode D2 also serves as a switching element 52 that blocks a reversed current from the first DC bus line 41 to the converter circuit 43.

The converter circuit 44 is a step-up converter circuit. The converter circuit 44 includes a reactor L, a switching element Q1, diodes D1, D2 and a smoothing capacitor C. The converter circuit 44 increases the voltage of the electric power generated from the fuel battery 23 and supplies the electric power to the first DC bus line 41 and the second DC bus line 42.

The diodes D1, D2 are output diodes. The diodes D1, D2 diverge the output of the converter circuit 44. The anode of the diode D1 is connected to a position between the reactor L and the switching element Q1. The cathode of the diode D1 is connected to the first DC bus line 41. The anode of the diode D2 is connected to a position between the reactor L and the switching element Q2. The cathode of the diode D2 is connected to the second DC bus line 42. The diode D1 also serves as a switching element 53 that blocks a revered current from the first DC bus line 41 to the converter circuit 44.

The converter circuit 45 is an AC/DC converter circuit. The converter circuit 45 includes two reactors L, four switching elements Q1, Q2, Q3, Q4, which constitute a full-bridge circuit, and diodes D1, D2. The converter circuit 45 increases or decreases the AC voltage supplied from the commercial power source 22. The converter circuit 45 further rectifies the AC voltage and supplies the DC voltage to the first DC bus line 41 and the second DC bus line 42. The converter circuit 45 can supply the electric power from the power distribution device 4 to the commercial power source 22. The high-side switching elements Q1, Q3 also serve as switching elements that block a reversed current from the first DC bus line 41 to the converter circuit 45.

The converter circuit 46 is an AC/DC converter circuit. The converter circuit 46 has a similar circuit structure to the converter circuit 45. The converter circuit 46 increases or decreases the AC voltage supplied from the wind power generator 24. The converter circuit 46 further rectifies the AC voltage and supplies the electric power to the first DC bus line 41 and the second DC bus line 42. The converter circuit 46 can supply the electric power from the power distribution device 4 to the wind power generator 24.

The converter circuit 47 is a converter circuit that serves as a step-down converter from the power distribution device toward the electric load device 3, and serves as a step-up converter from the electric load device 3 toward the power distribution device 4. The converter circuit 47 includes a reactor L, two switching element Q1, Q2, which are connected in a half-bridge manner, and a smoothing capacitor C. The converter circuit 47 decreases the voltage of the first DC bus line 41 and supplies the electric power to any one of or some of the electric load devices 32, 33, 34.

The converter circuit 47 electrically connects between the vehicle secondary battery 32 and the first DC bus line 41 in dual directions. The converter circuit 47 electrically charges the vehicle secondary battery 32 by the electric power from the first DC bus line 41. Also, the converter circuit 47 supplies the electric power from the vehicle secondary battery 32 to the first DC bus line 41 after increasing its voltage.

The converter circuit 47 electrically connects between the portable secondary battery 33 and the first DC bus line 41 in dual directions. The converter circuit 41 electrically charges the portable secondary battery 33 by the electric power of the first DC bus line 41. The converter circuit 47 supplies the electric power of the portable secondary battery 33 to the first DC bus line 41.

The converter circuit 47 electrically connects between the DC electric load 34 and the first DC bus line 41 in one direction. The converter circuit 47 supplies the electric power from the first DC bus line 41 to the DC electric load 34.

The selective relays RL1, RL2 are controlled so that the electric power of the vehicle secondary battery 32 is not directly supplied to the portable secondary battery 33. The selective relays RL1, RL3 are controlled so that the electric power of the vehicle secondary battery 32 is not directly supplied to the DC electric load 34. The selective relays RL1, RL2, RL3 are controlled so that only one of the electric loads 32, 33, 34 are connected to the converter circuit 47.

The converter circuit 48 is a step-down converter circuit that serves as a step-down converter from the power distribution device toward the electric load devices 3. The converter circuit 48 includes a reactor L, a switching element Q1, a diode D1 and a smoothing capacitor C. The converter circuit 48 decreases the voltage of the electric power from the first DC bus line 41 and supplies the electric power to one of the electric load devices 3. The converter circuit 48 electrically connects between the water heater 35 and the first DC bus line 41 in one direction. The converter circuit 48 supplies the electric power of the first DC bus line 41 to the water heater 35.

The fixed secondary battery 31 is normally connected to the first DC bus line 41 without through a voltage converter device such as a converter circuit.

The converter circuits 43, 44, 45, 46 are also referred to as power source-side converter circuits or first converter circuits. The first converter circuits 43, 44, 45, 46 convert the source voltage into a first voltage or a second voltage and outputs the first voltage or the second voltage. When the first converter circuits 43, 44, 45, 46 output the electric power at the first voltage, the fixed secondary battery 31 is charged with the electric power at the first voltage.

The converter circuits 47, 48 are also referred to as load-side converter circuits or second converter circuits. The second converter circuits 47, 48 converts the first voltage of the electric power outputted from the first converter circuits 43, 44, 45, 46 or the first voltage of the electric power outputted from the fixed secondary battery 31 into the second voltage.

The electric load devices 32, 33, 34, 35 are supplied with the electric power at the second voltage outputted from the second converter circuits 47, 48.

The power distribution device 4 further includes a direct power supply circuit 50 that directly connects between the second DC bus line 42 and an output-side of the converter circuit 47. The direct power supply circuit 50 provides a power supply path to directly supply the electric power from the power source devices 21, 22, 23, 24 to the electric load devices 32, 33, 34 without passing through the converter circuit 47. When the converter circuits 43, 44, 45, 46 output the electric power at the second voltage, the direct power supply circuit 50 directly supplies the output of the converter circuits 43, 44, 45, 46 to the electric load devices 32, 33, 34 without passing through the converter circuit 47. For example, when the vehicle secondary battery 32 is selected by the selective relays RL1, RL2, RL3, a charging current of the vehicle secondary battery 32 is supplied through the direct power supply circuit 50.

The direct power supply circuit 50 is provided with a singe-throw single-contact type relay 51 as a switching element for connecting and disconnecting the direct power supply circuit 50. The relay 51 is disposed in the direct power supply circuit 50 in series. When the converter circuit 43, 44, 45, 46 outputs the electric power at the first voltage, the relay 51 opens the direct power supply circuit 50. When the converter circuit 43, 44, 45, 46 outputs the electric power at the second voltage, the relay 51 closes the direct power supply circuit 50. When the relay 51 is closed, the direct power supply circuit 50 is formed. When the relay 51 is opened, the direct power supply circuit 51 is interrupted.

The diode D2 of the converter circuit 43 provides the switching element 52 that blocks the electric connection between the first DC bus line 41 and the converter circuit 43 when at least one of the converter circuits 43, 44, 45, 46 supplies the electric power to the direct power supply circuit 50 through the second DC bus line 42. The switching element 52 restricts the high voltage of the first DC bus line 41 from being applied to the second DC bus line 42 via the converter circuit 43. Because the first DC bus line 41 is applied with the voltage of the fixed secondary battery 31, the switching element 52 serves as a blocking element that blocks electric conduction between the high voltage secondary battery 31 and the direct power supply circuit 50.

Similarly, the diode D1 of the converter circuit 44 provides the switching element 53 that blocks the electric connection between the first DC bus line 41 and the converter circuit 44, when at least one of the converter circuits 43, 44, 45, 46 supplies the electric power to the direct power supply circuit 50 via the second DC bus line 42. The switching element 53 restricts the high voltage of the first DC bus line 41 from being applied to the second DC bus line 42 via the converter circuit 44. The switching element 53 serves as a blocking element that blocks electric conduction between the high voltage secondary battery 31 and the direct power supply circuit 50.

Further, the high-side switching elements Q1, Q3 provide the switching elements 54 that block the electric connection between the first DC bus line 41 and the converter circuit 45, when at least one of the converter circuits 43, 44, 45, 46 supplies the electric power to the direct power supply circuit 50 via the second DC bus line 42. The switching elements 54 restrict the high voltage of the first DC bus line 41 from being applied to the second DC bus line 42 via the converter circuit 45. The switching elements 54 serve as blocking element that blocks electric conduction between the high voltage secondary battery 31 and the direct power supply circuit 50.

Similar to the converter circuit 45, the converter circuit 46 has a switching element that blocks an electric connection between the first DC bus line 41 and the converter circuit 46, when at least one of the converter circuits 43, 44, 45, 46 supplies the electric power to the direct power supply circuit 50 via the second DC bus line 42.

The relay 51 and the switching elements 52, 53, 54 form the direct power supply circuit 50 which allows at least one of the converter circuits 43, 44, 45, 46, which convert the voltages of the electric power from the power source devices 21, 22, 23, 24, to supply the electric power to the electric load devices 32, 33, 34 via the second DC bus line 42, and provide the blocking elements that block the electric conduction between the fixed secondary battery 31 and the direct power supply circuit 50.

The power distribution device 4 includes a control unit 49. The control unit 49 controls the multiple switching elements, the relays and the like disposed in the power distribution device 4 so that the a predetermined circuit is formed in the power distribution device 4, and circuit elements contained in the circuit realize desired functions. The control unit 49 controls the switching elements of the converter circuit 43, 44, 45, 46, 47, 48. Further, the control unit 49 controls the system relay RL, the selective relays RL1, RL2, RL3, and the relay 51.

The voltages of the power source devices 2, the voltages of the electric load devices 3, the current values detected by the current sensors CS are inputted to the control unit 49, and are used for the control of the power distribution device 4. For example, the control unit 49 is provided by a microcomputer including a storage medium that can be read by means of a computer. The storage medium stores a program that can be read by means of the computer. The storage medium is provided by a memory. The program permits the control unit 49 to provide the functions described in this application and to execute the controls described in this application. The means or elements provided by the power distribution device 4 based on the control of the control unit 49 can be referred to as function blocks or modules that achieve predetermined functions.

In the present embodiment, the control unit 49 includes a first power supplying element and a second power supplying element. The first power supplying element and the second power supplying element are selectively executed, and are not executed at the same time.

The first power supplying element controls the first converter circuits 43, 44, 45, 46 to convert the voltage of the electric power supplied from the power source devices 21, 22, 23, 24 into the first voltage of the fixed secondary battery 31, and output the electric power at the converted voltage. The first power supplying element also serves as a charging element that electrically charges the high-voltage fixed secondary battery 31. The first power supplying element controls the load-side second converter circuit 47 to convert the first voltage of the electric power supplied from the first converter circuits 43, 44, 45, 46 and/or the fixed secondary battery 31 into the second voltage of the electric load devices 32, 33, 34.

By the first power supplying element, the electric power generated from the power source devices 21, 22, 23, 24 is supplied to the electric load devices 32, 33, 34 via both of the first converter circuits 43, 44, 45, 46 and the second converter circuit 47. The electric load devices 32, 33, 34 include the low-voltage secondary battery 32 whose voltage is lower than the voltage of the fixed secondary battery 31. When the electric power is supplied to the low-voltage secondary battery 32, the first power supplying element can be referred to as a first charging element.

The second power supplying element controls the first converter circuits 43, 44, 45, 46 to convert the voltages of the electric power generated from the power source devices 21, 22, 23, 24 into the second voltage, and output the electric power at the second voltage. The second power supplying element controls the power distribution device 4 so that the outputs of the first converter circuits 43, 44, 45, 46 are directly supplied to the electric load devices 32, 33, 34 without passing through the second converter circuit 47. Specifically, the control unit 49 controls the relay 51 to close the direct power supply circuit 50.

Further, the second power supplying element controls the power distribution device 4 to restrict the electric power of the fixed secondary battery 31 from being supplied to the direct power supply circuit 50 via the first converter circuits 43, 44, 45, 46. Specifically, the control unit 49 controls the switching elements 52, 53, 54 that block power supply circuits between the fixed secondary battery 31 and the output-sides of the first converter circuits 43, 44, 45, 46. The electric load devices 32, 33, 34 can include the low-voltage secondary battery 32 whole voltage is lower than that of the fixed secondary battery 31. When the electric power is supplied to the low-voltage secondary battery 32, the second power supplying element can be referred to as a second charging element.

In an operation of the power supply apparatus 1, a first power supplying mode and a second power supplying mode are provided. In the first power supplying mode, the electric power at the voltage of the fixed secondary battery 31, that is, the electric power at the first voltage is supplied from the power source devices 21, 22, 23, 24 and the converter circuits 43, 44, 45, 46. In the second power supplying mode, the electric power at the voltage of the electric load devices 32, 33, 34, that is, the electric power at the second voltage is supplied from the power source devices 21, 22, 23, 24.

In the first power supplying mode, the voltages of the electric power generated from the power source devices 21, 22, 23, 24 are converted into the first voltage through the first converter circuits 43, 44, 45, 46. Thus, the electric power at the first voltage is supplied into the first DC bus line 41, and the fixed secondary battery 31 is charged with the electric power supplied from the first DC bus line 41. As such, the fixed secondary battery 31 is charged through the power source devices 21, 22, 23, 24 and the first converter circuits 43, 44, 45, 46.

In the first power supplying mode, further, the first voltage on the first DC bus line 41 is converted into the load voltage corresponding to the electric load devices 32, 33, 34, 35, that is, into the second voltage, by the second converter circuits 47, 48. The electric power is supplied to the electric load devices 32, 33, 34, 35 in accordance with the outputs of the second converter circuits 47, 48. In such a case, the second converter circuits 47, 48 convert the voltages of the electric power supplied from the first converter circuits 43, 44, 45, 46 to the first DC bus line 41 and/or the voltage of the electric power supplied from the fixed secondary battery 31 to the first DC bus line 41, and supply the electric power at the converted voltages to the electric load devices 32, 33, 34, 35.

For example, the output voltage of the solar power generator 21 is converted into the charging voltage of the fixed secondary battery 31, that is, into the first voltage through the first converter circuit 43, and the electric power at the first voltage is supplied into the first DC bus line 41 via the diode D2. This electric power is supplied into the fixed secondary battery 31. Thus, the fixed secondary battery 31 is electrically charged.

Further, the voltage of the electric power of the first DC bus line 41 is converted into the load voltage, that is, the second voltage of any one of the electric load devices 32, 33, 34, and the electric power at the second voltage is then supplied to the corresponding electric load device 32, 33, 34. For example, in a case where the control unit 49 controls the selective relays RL1, RL2, RL3 so that the vehicle secondary battery 32 is connected to the second converter circuit 47, the control unit 49 controls the switching elements Q1, Q2 of the second converter circuit 47 so that the second converter circuit 47 serves as the step-down converter circuit. The output of the second converter circuit 47 is supplied into the vehicle secondary battery 32. As such, the vehicle secondary battery 32 is electrically charged.

In the second power supplying mode, the voltages of the electric power supplied from the power source devices 21, 22, 23, 24 are converted into the second voltage through the first converter circuits 43, 44, 45, 46, and the electric power at the second voltage is supplied into the second DC bus line 42 through the diode D3. The second voltage corresponds to the load voltage of any one of the electric load devices 32, 33, 34, which is selected by the selective relays RL1, RL2, RL3 as the load selecting elements. Therefore, the second voltage is lower than the first voltage.

In this case, the first DC bus line 41 is applied with the first voltage from the fixed secondary battery 31. Therefore, the diode D2 blocks the electric conduction from the first DC bus line 41 to the second DC bus line 42.

In the second power supplying mode, further, the control unit 49 controls the relay 51 to be in an on state so that the direct power supply circuit 50 is closed. Thus, the electric power supplied from the first converter circuits 42, 43, 44, 45 is directly supplied to one of the electric load devices 32, 33, 34 via the second DC bus line 42 and the direct power supply circuit 50.

In the second power supplying mode, the electric power is supplied to the electric load device 32, 33, 34 from the first converter circuit 43, 44, 45, 46 without passing through the second converter circuit 47, particularly, without passing through the switching elements Q1, Q2 of the second converter circuit 47. As such, the electric power is efficiently supplied to the electric load device 32, 33, 34 without causing power loss in the second converter circuit 47. For example, since the power loss is restricted by realizing the power supply without passing through the second converter circuit 47, it is advantageous, especially, in a case where the electric power is largely required in the selected electric load device 32, 33, 34.

For example, in a case where the vehicle secondary battery 32, which is one of the electric load devices 3, is to be electrically charged, the first converter circuit 43 supplies the electric power at the charging voltage of the vehicle secondary battery 32, that is, the electric power at the second voltage to the second DC bus line 42. This electric power is directly supplied to the vehicle secondary battery 32 from the first converter circuit 43 via the direct power supply circuit 50, without being charged to the fixed secondary battery 31 and without passing through the second converter circuit 47. In this way, the vehicle secondary battery 32 is charged.

The vehicle secondary battery 32 has the relatively large capacity. Further, the vehicle secondary battery 32 can be electrically charged only when the vehicle is connected to the house, such as, the power supply apparatus 1. Therefore, the vehicle secondary battery 32 needs to be charged in a short time. Further, high power is required to charge the vehicle secondary battery 32.

In the present embodiment, the first converter circuit 43 generates the electric power at the charging voltage of the vehicle secondary battery 32, that is, the electric power at the second voltage. The electric power at the second voltage is supplied to the vehicle secondary battery 32 via the direct power supply circuit 50, without passing through the second converter circuit 47. Therefore, the vehicle secondary battery 32 can be electrically charged without causing power loss in the second converter circuit 47. Accordingly, the high power can be supplied to the vehicle secondary battery 32 while suppressing the power loss.

Second Embodiment

Figure 2:
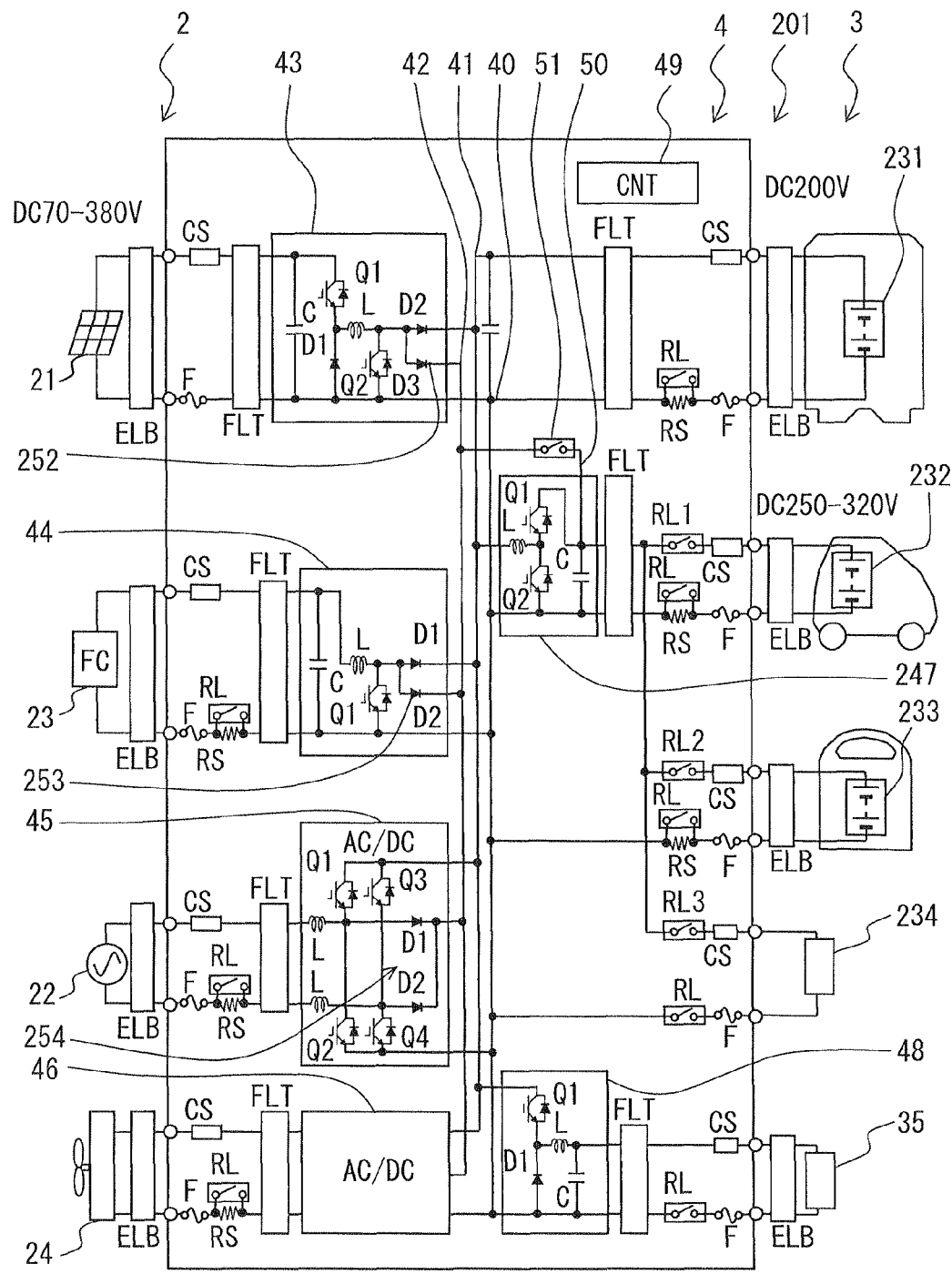
FIG. 2 is a block diagram of a power supply apparatus according to a second embodiment.

FIG. 2 is a block diagram illustrating a power supply apparatus 201 according to a second embodiment. Hereinafter, structure(s) and operation(s) different from those of the first embodiment will be mainly described.

The power supply apparatus 201 includes a fixed secondary battery 231 whose voltage is lower than the voltage of the fixed secondary battery 31 of the first embodiment. Also, the power supply apparatus 201 has a vehicle secondary battery 232 whose voltage is higher than the voltage of the vehicle secondary battery 32 of the first embodiment. The voltage of the fixed secondary battery 231 is DC 200V. The voltage of the vehicle secondary battery 232 is in a range between DC 250V and DC 320V. The voltage of the vehicle secondary battery 232 is higher than the voltage of the fixed secondary battery 231. The voltage of a portable secondary battery 233 and the rated voltage of the DC electric load 234 are higher than the voltage of the fixed secondary battery 231. In the present embodiment, the relation between the voltage of the fixed secondary battery 231 and the voltage of the vehicle secondary battery 232 is opposite to the relation between the voltage of the fixed secondary battery 31 and the voltage of the vehicle secondary battery 32 of the first embodiment. Thus, the first voltage is lower than the second voltage.

The power distribution device 4 includes a converter circuit 247, in place of the second converter circuit 47 of the first embodiment. The converter circuit 247 electrically connects between the electric load devices 232, 233, 234, 235 and the first DC bus line 41 in dial directions. The converter circuit 247 increases the voltage of the electric power of the first DC bus line 41, and then supplies the electric power to the electric load devices 232, 233, 234, 235. Further, the converter circuit 247 decreases the voltage of the electric power from the vehicle secondary battery 232 or the portable secondary battery 233, and then supplies the electric power to the first DC bus line 41.

In the present embodiment, the voltage of the second DC bus line 42 is higher than that of the first DC bus line 41. Therefore, the diode D3 of the converter circuit 43 serves as a blocking element 252 that blocks electric conduction between the fixed secondary battery 231 and the direct power supply circuit 50. The diode D3 restricts the second voltage of the vehicle secondary battery 232 from being applied to the fixed secondary battery 231 via the first DC bus line 41, when the relay 51 is closed. In the converter circuit 44, the diode D2 provides a blocking element 253. In the converter circuits 45, 46, the diodes D1, D2 provide blocking elements 254.

Also in the present embodiment, the advantageous effects similar to those of the first embodiment can be achieved.

Third Embodiment

Figure 3:
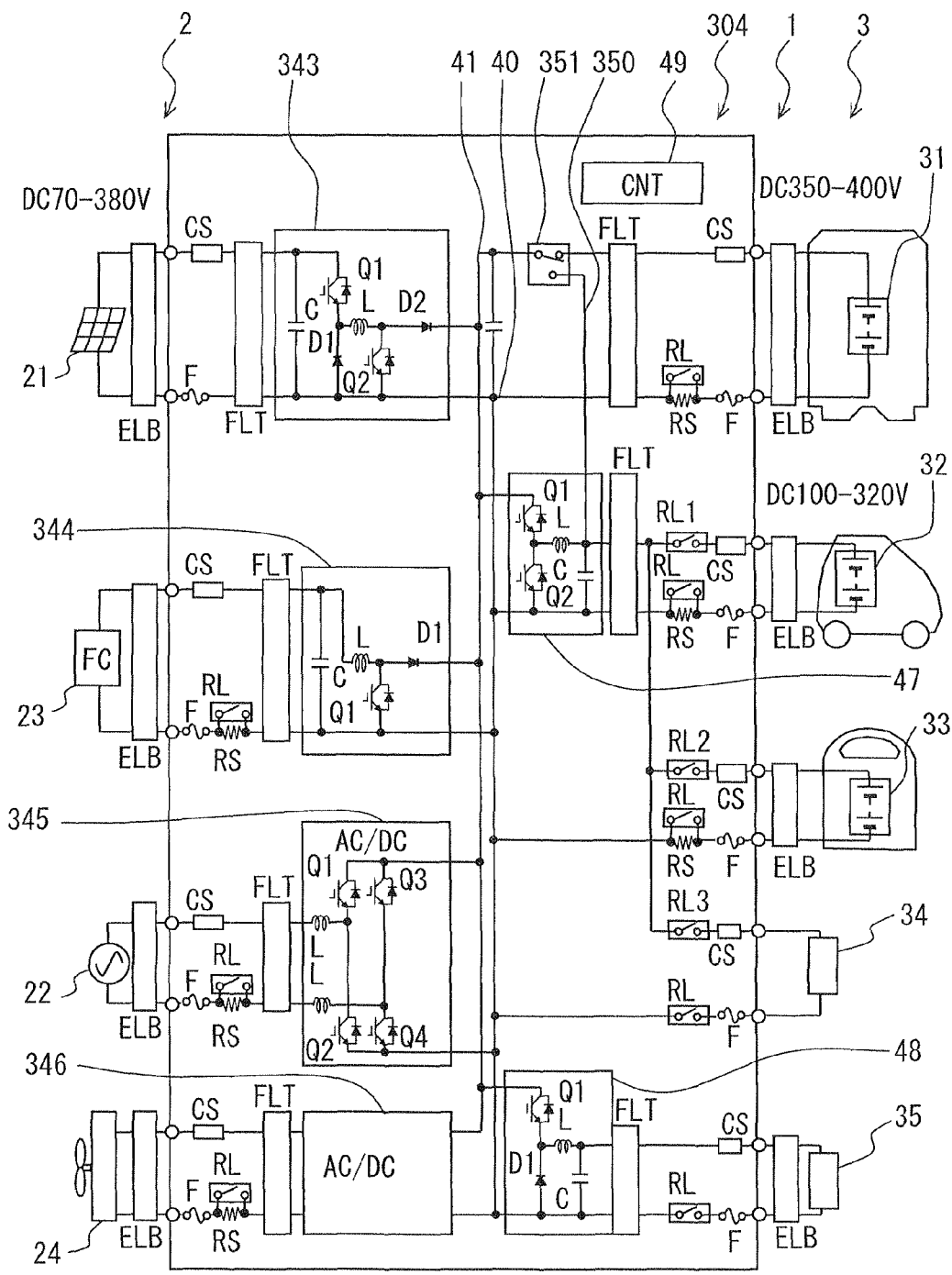
FIG. 3 is a block diagram of a power supply apparatus according to a third embodiment.

FIG. 3 is a block diagram illustrating a power supply apparatus 304 according to a third embodiment. Hereinafter, structure(s) and operation(s) different from those of the first and second embodiments will be mainly described.

The power supply apparatus 304 does not have the second DC bus line 42. First converter circuits 343, 344, 345, 346, which are employed in place of the first converter circuits 43, 44, 45, 46, are configured to supply electric power only to the first DC bus line 41. Each of the converter circuits 345, 346 includes two reactors L and four switching elements Q1, Q2, Q3, Q4, which are connected in a full-bridge manner.

The power supply apparatus 304 includes a direct power supply circuit 350, in place of the direct power supply circuit 50. The direct power supply circuit 350 is diverged from the first DC bus line 41 and is connected between the second converter circuit 47 and the electric load devices 32, 33, 34. At a diverging portion where the direct power supply circuit 350 diverges from the first DC bus line 41, a single-throw two-contact relay 351 is provided, in place of the relay 51.

The relay 351 can be switched between a first state where the first DC bus line 41 is connected only to the fixed secondary battery 31 and a second state where the first DC bus line 41 is connected only to the direct power supply circuit 350. When the first converter circuits 343, 344, 345, 346 output the electric power at the first voltage, the relay 351 opens the direct power supply circuit 350 and closes a charging circuit from the first converter circuits 343, 344, 345, 346 to the fixed secondary battery 31. When the first converter circuit 343, 344, 345, 346 outputs the electric power at the second voltage, the relay 351 closes the direct power supply circuit 350 and opens the charging circuit. The relay 351 provides the similar function to that of the relay 51 of the above described embodiments, and the similar function to that of the switching elements 52, 53, 54 of the above described embodiments.

In the present embodiment, in the first power supplying mode, the relay 351 is connected to the line of the fixed secondary battery 31. In the second power supply mode, the relay 351 is connected to the line of the direct power supply circuit 350. Also in the present embodiment, the advantageous effects similar to those of the above described embodiments can be achieved.

Other Embodiments

Various exemplary embodiments of the present invention are described hereinabove. However, the present invention is not limited to the above described exemplary embodiments, but may be implemented in various other ways without departing from the spirit of the invention. The structures of the above described exemplary embodiments are examples, and thus the scope of the present invention is not limited to the above described scopes.

For example, the multiple power source devices 2 may include a secondary battery. The electric power can be supplied to the electric load device from the secondary battery as the power source device through the converter circuit and the direct power supply circuit.

The vehicle secondary battery 32 may be a secondary battery that is used as a power source for a refrigerating apparatus for a vehicle.

In place of the converter circuits 345, 346, rectifying circuits having diode bridges may be employed. The circuit structures of the converter circuits 43, 44, 45, 46, 345, 346 may be replaceable with various circuits. For example, in place of the non-insulated chopper circuits as illustrated, insulated transformer circuits may be employed. Also, in place of one of or some of the one-way transformer circuits, a bidirectional transformer circuit(s) may be employed. Further, in place of one of or some of the bidirectional transformer circuits, a one-way transformer circuit(s) may be employed.

In the above described exemplary embodiments, the blocking elements are provided by the semiconductor switching elements such as the diode D2 or and the like. Alternatively, the blocking elements may be provided by any other semiconductor switching elements, such as MOSFET, IGBT or the like. The MOSFET serves as a resistor when in an on state and permits the electric current in dual directions. In such a case, for example, a drain is connected to the DC bus lines 41, 42 and a source is connected to the reactor L. In a case of employing the IGBT, a collector is connected to the reactor L and an emitter is connected to the DC bus lines 41, 42.

The elements and functions provided by the control unit may be implemented only by software, only by hardware, or combination of the software and the hardware. For example, the control unit may be provided by an analog circuit.

Additional advantages and modifications will readily occur to those skilled in the art. The invention in its broader term is therefore not limited to the specific details, representative apparatus, and illustrative examples shown and described.

What is claimed is:

1. A power supply apparatus comprising:
a plurality of power sources each generating electric power at a predetermined source voltage;
an electric load device;
a secondary battery; and
a power distribution device being connected to the plurality of power sources the electric load device and the secondary battery device, wherein
the power distribution device includes a DC bus line and a plurality of first converter circuits, each of the first converter circuits being disposed between corresponding one of the power sources and the DC bus line;
each of the first converter circuits converts the predetermined source voltage into one of a first voltage and a second voltage, and outputs one of electric power at the first voltage and electric power at the second voltage to the DC bus line;
the second battery is charged with the electric power at the first voltage when the first converter circuit outputs the electric power at the first voltage;
the power distribution device further includes a second converter circuit that converts one of the first voltage of the electric power outputted from the first converter circuit to the DC bus line and the first voltage of electric power outputted from the secondary battery to the DC bus line into the second voltage;
the electric load device is supplied with the electric power at the second voltage outputted from the second converter circuit;
the power distribution device further includes a direct power supply circuit that directly supplies the electric power at the second voltage outputted from the first converter circuit to the electric load device without passing through the second converter circuit, when the first converter circuit outputs the electric power at the second voltage to the DC bus line;
the power distribution device further includes a control unit that controls the plurality of first converter circuits, the second converter circuit and the direct power supply circuit to provide a first power supply mode and a second power supply mode;
in the first power supply mode, the control unit controls each of the plurality of first converter circuits to convert the predetermined power source voltage into the first voltage and output the electric power at the first voltage to the DC bus line, and the second converter circuit to convert the first voltage of the electric power supplied from at least one of the secondary battery and the plurality of first converter circuits into the second voltage, so that the secondary battery is charged by the electric power provided by the plurality of power sources and the plurality of first converter circuits, and the electric power generated by the plurality of power sources is supplied to the electric load device via the plurality of first converter circuits and the second converter circuit; and in the second power supply mode, the control unit controls each of the plurality of first converter circuits to convert the predetermined source voltage into the second voltage and output the electric power at the second voltage to the DC bus line, and closes the direct power supply circuit, so that the electric power at the second voltage outputted by the plurality of first converter circuits is directly supplied to the electric load device via the DC bus line and the direct power supply circuit without being supplied to the secondary battery.

2. The power supply apparatus according to claim 1, further comprising a relay disposed on the direct power supply circuit, wherein the relay is configured to open the direct power supply circuit when the first converter circuits output the electric power at the first voltage, and to close the direct power supply circuit when the first converter circuits output the electric power at the second voltage.

3. The power supply apparatus according to claim 1, further comprising a blocking element that blocks electric conduction between the secondary battery and the direct power supply circuit when the first converter circuits output the electric power at the second voltage.

4. The power supply apparatus according to claim 3, wherein the blocking element includes a semiconductor switching element, the semiconductor switching element being at least one of a diode, a MOSFET, and an IGBT.

5. The power supply apparatus according to claim 2, wherein the relay is a two-point relay that opens the direct power supply circuit and closes a charging circuit from the first converter circuit to the secondary battery when the first converter circuits output the electric power at the first voltage, and closes the direct power supply circuit and opens the charging circuit when the first converter circuits output the electric power at the second voltage.

6. The power supply apparatus according to claim 1, wherein
the secondary battery is a first secondary battery,
the electric load device includes a second secondary battery, and
the direct power supply circuit supplies a charging current to the second secondary battery.

7. The power supply apparatus according to claim 6, wherein
the first secondary battery is a fixed secondary battery, and
the second secondary battery is a secondary battery for a vehicle.

* * * * *